No. 851,104. PATENTED APR. 23, 1907.
J. REID.
MEANS FOR OPERATING ROD LINES FOR OIL WELLS.
APPLICATION FILED FEB. 8, 1906.
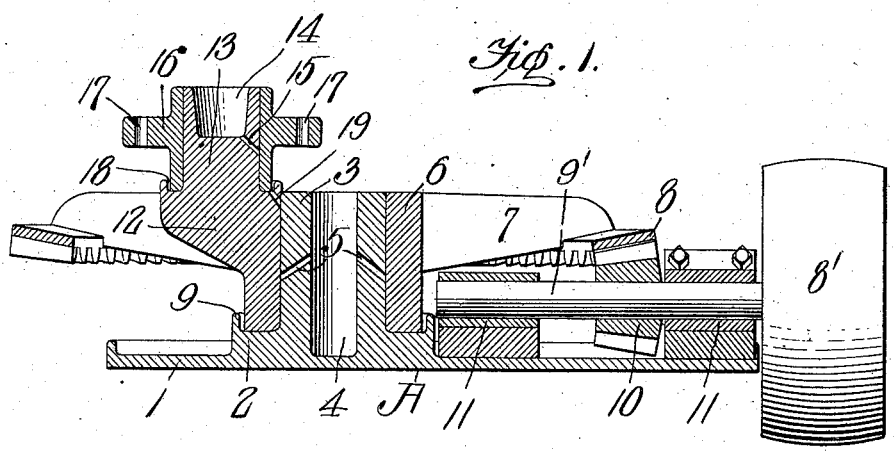
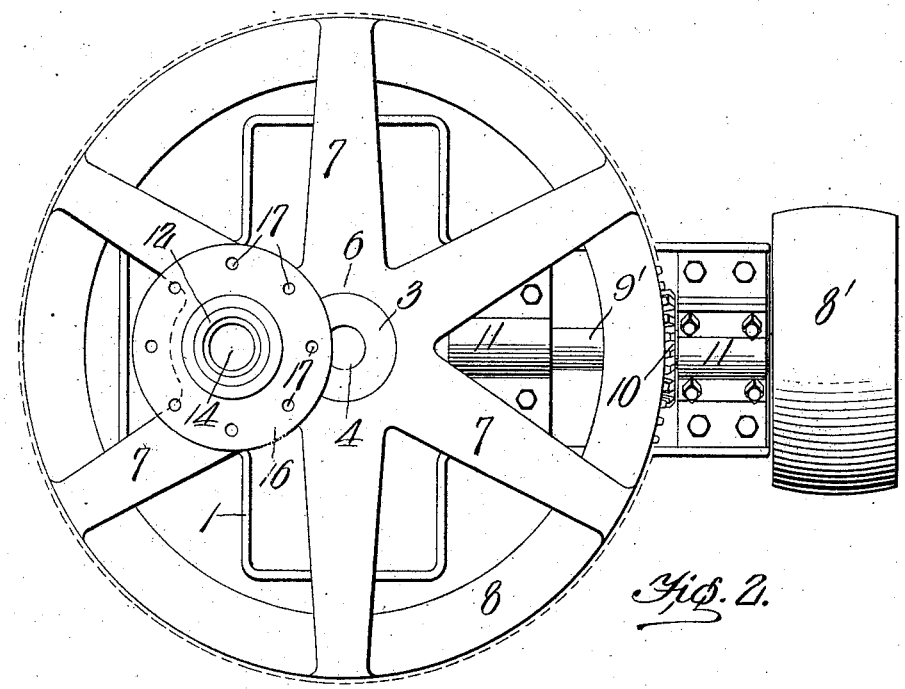
WITNESSES:
INVENTOR
Joseph Reid
BY Knight Bros
Attorneys

UNITED STATES PATENT OFFICE.

JOSEPH REID, OF OIL CITY, PENNSYLVANIA.

MEANS FOR OPERATING ROD-LINES FOR OIL-WELLS.

No. 851,104.  Specification of Letters Patent.  Patented April 23, 1907.

Application filed February 8, 1906. Serial No. 300,169.

*To all whom it may concern:*

Be it known that I, JOSEPH REID, a citizen of the United States, residing in Oil City, in the county of Venango and State of Pennsylvania, have invented certain new and useful Improvements in Means for Operating Rod-Lines for Oil-Wells; and I do hereby declare the following to be a full, clear, and exact description of the invention, such as will enable others skilled in the art to which it appertains to make and use the same.

My invention, which relates to an improvement in apparatus for operating oil wells, presents a construction for that class of pumping power devices in which the reciprocation of a plurality of rods is provided for. The merits of this design lie in the economical structure, as to its cost of manufacture and in its durability in use.

In the accompanying drawings, Figure 1 is a vertical sectional view of the disk power design, and Fig. 2 is a plan view of the same.

Like figures refer to the same parts in all the figures.

In the drawings:—A is the base plate, consisting in one piece of the flat flanged portion 1, a raised flanged portion 2 and a hollow cylindrical portion 3 projecting vertically therefrom. Rotatably mounted on the cylindrical portion 3 as an arbor is a large bevel gear, comprising as an integral whole, the hub 6, arms 7, hub boss portion 12, and a toothed rim portion 8 through which it is driven by the bevel gear pinion 10. About the lower end of the hub 6, there is formed an annular space within the flange 9 in which the oil or other lubricant is contained. For a further improvement in the means for lubricating this bearing, the hollowed cylindrical portion 4 of the arbor 3 may be filled with oil saturated waste from which the oil can be fed to the bearing through the perforations 5. For a still further means of lubricating this bearing, a perforation 19 in the hub boss section 12, to be hereinafter described, may be utilized to conduct oil from the annular space 18 thereto. The hub boss portion 12 which is formed integrally with the hub and two of the arms, has a vertically projecting crank pin 13 which is also integral therewith.

By making the crank pin integral with the bevel gear, the advantages gained reside not only in an increased rigidity, lightness and strength, but also in the utilization, at a point peculiarly subject to wear, of the well known properties of the cast iron turning pair. The turning of a cast iron journal within a cast iron bearing has been found, after some months of steady running, to have produced the most durable of bearing surfaces, a result not obtained when the inserted steel crank pin is made use of. Turning upon the crank pin 13 and supported by the enlarged portion of the hub boss 12 is the rod driving disk 16 with holes 17 for attaching thereto the well operating rods (not shown). Surrounding the lower end of the hub of the rod driving disk, is an annular groove of similar construction to that shown about the above mentioned bevel gear hub.

To provide a simple automatic means for oiling the rod driving disk the upper part of the crank pin 13 is made with a hollow portion 14 and oil perforation 15 leading therefrom to the bearing. The oil perforation 19 hereinbefore mentioned extends from the annular basin 18 to the main bevel gear bearing, thus providing a self acting means for a second use of the oil from the oil cup 14.

The perforations 5 may or may not be used just as desired, the device being self lubricating without their use.

The driving mechanism is supported by the bearing blocks 11, 11, held in such position in the base plate as to hold a shaft mounted driving pinion in driving relation with the toothed rim portion 8 of the larger bevel gear.

8' is a belt pulley keyed to shaft 9' by means of which power is delivered to the machine.

Having thus described my invention, what I claim is:

1. In an oil pumping power, the combination with a main driving shaft, of a bed plate comprising a bottom plate with upwardly turned edges, a raised boss portion on said plate and provided with an annular flange from within which projects a vertical arbor, and a pair of driving-shaft blocks for said driving shaft; a main drive wheel mounted on said arbor and seated between it and the said annular flange and comprising a central hub portion, an outer toothed rim portion, a plurality of arms connecting the said hub portion to the said rim portion, a boss between two adjacent arms, a hollowed crank pin protruding from said boss, an annular flanged seat flush with the upper edges of said arms, and surrounding said crank pin, and rod driving disk carried by the hollowed crank pin; the several parts of the mechanism being provided with a series of channels or passages whereby the lubricant is fed successively through the bearings of the rod driving disk and main driving wheel.

2. In an oil pumping power, the combination with a bed plate in which is supported an upright arbor; of a main driving wheel constructed with hub, rim and arms journaled upon the arbor and comprising between two adjacent arms thereof, a crank pin, the said crank pin being provided in the upper part thereof with an open cup, an outlet therefrom for leading the lubricant from said cup to the bearing surface of the crank pin, and a lubricant retaining cup surrounding it from which by means of a second outlet, the lubricant is conveyed to the main driving wheel bearing where it is used a second time.

3. In an oil pumping power, the combination of a base plate provided with an upright hollowed arbor extending therefrom, an annular seat portion surrounding said arbor, a main driving wheel rotating on the arbor and supported on the said annular seat, a vertically projecting crank pin carried by the main driving wheel within which is comprised a reservoir for lubricant and a channel for conveying the lubricant from the reservoir to the outside surface of the crank pin from which it feeds into a second reservoir, the said second reservoir being provided with an outlet by means of which the lubricant is fed from this second reservoir to the said upright arbor.

4. In an oil well pumping power, the combination of a base plate having an integral arbor projecting vertically therefrom, and bearings for a horizontal drive shaft, a drive shaft journaled in said bearings and carrying a bevel gear, a main drive wheel journaled upon said arbor and constructed with an integral toothed rim meshing with the bevel gear, and integral spoke and hub portions, and an integral boss on the hub portion between two of the spokes formed with an integral vertically projecting crank pin and a rod wheel journaled on said crank pin and constructed for the attachment of a plurality of pumping rods.

The foregoing specification signed at Oil City, Pennsylvania, this 29th day of January, 1906.

JOSEPH REID.

In presence of two witnesses—
J. D. TRAX,
J. T. HADLEY.